Dec. 21, 1948.    C. B. LIVERS    2,456,967
ELECTRIC MOTOR
Filed Dec. 17, 1946    2 Sheets-Sheet 1
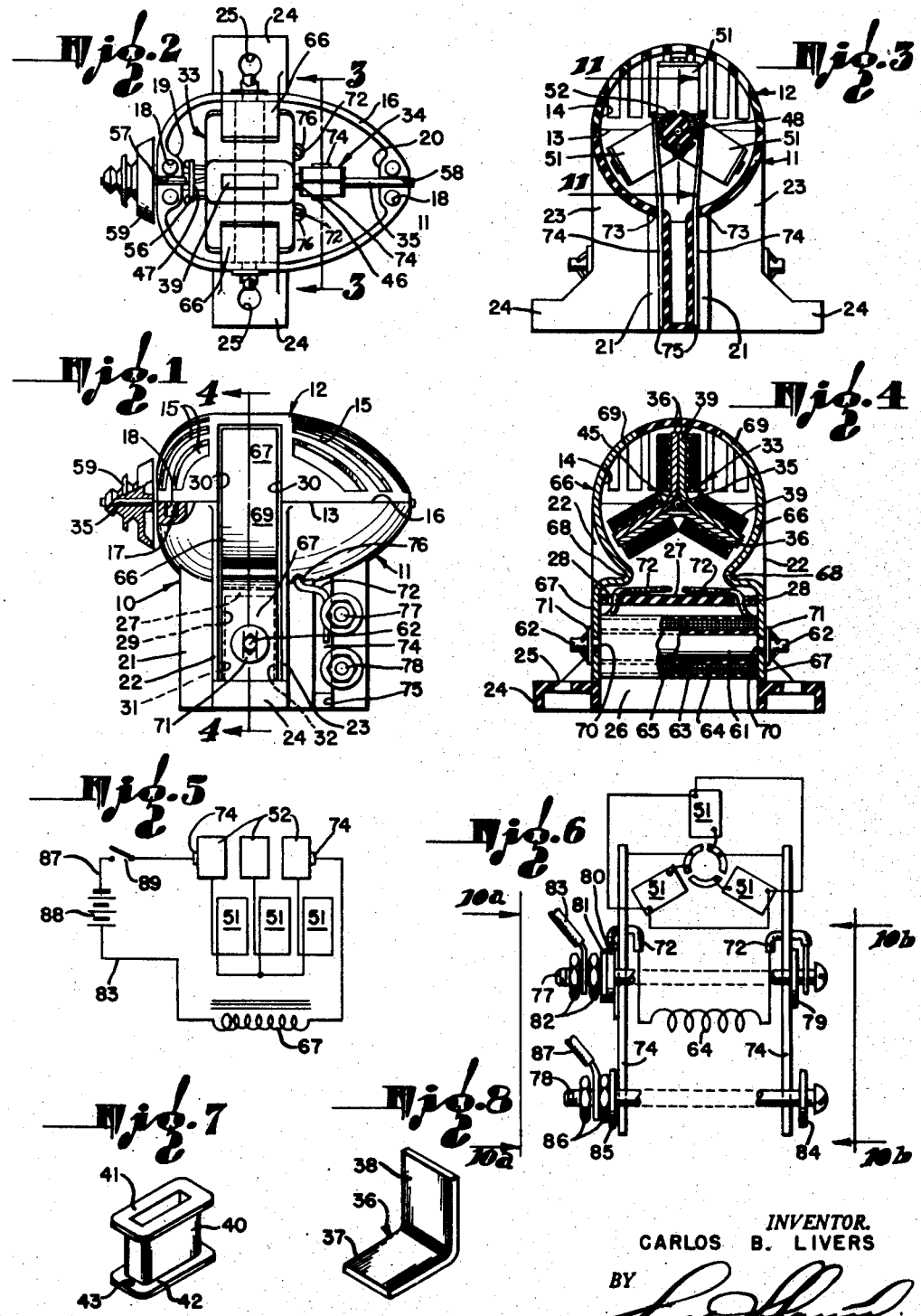
INVENTOR.
CARLOS B. LIVERS
BY
ATTORNEY Dec. 21, 1948.                C. B. LIVERS                 2,456,967
                              ELECTRIC MOTOR
Filed Dec. 17, 1946                                    2 Sheets-Sheet 2
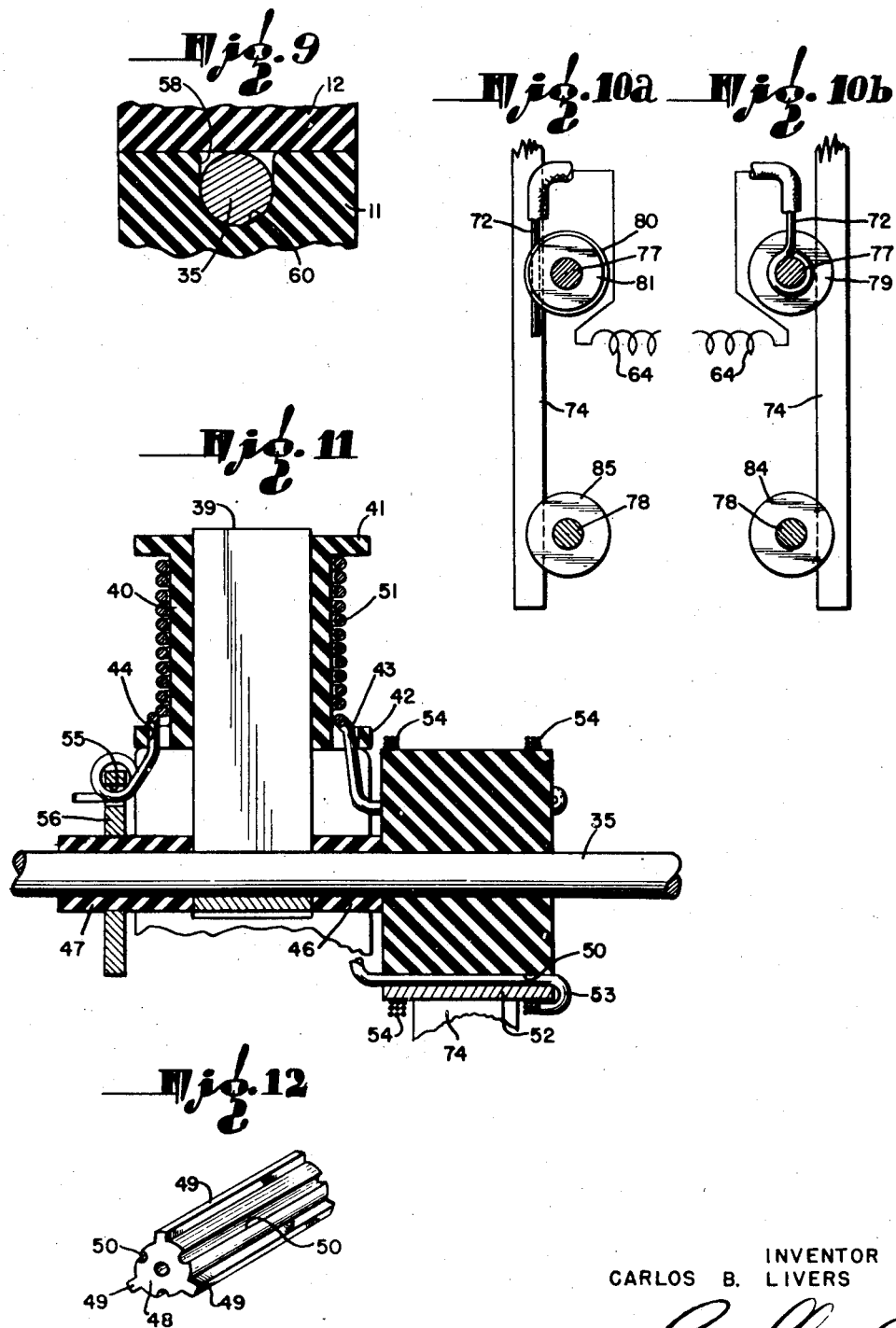
INVENTOR
CARLOS B. LIVERS
ATTORNEY Patented Dec. 21, 1948

2,456,967

UNITED STATES PATENT OFFICE 2,456,967

ELECTRIC MOTOR

Carlos B. Livers, North Hollywood, Calif., assignor to Variety Development and Engineering Company, Los Angeles, Calif., a copartnership consisting of Carlos B. Livers and Ralph E. Middleton Application December 17, 1946, Serial No. 716,853

14 Claims. (Cl. 172—36)

1

The present invention relates generally to electric motors, and is more particularly concerned with improvements in the construction of small motors.

It is a primary object of the present invention to provide a motor of simple and inexpensive construction in which the component parts are so designed as to permit distribution in knocked down, partially fabricated kit form, and which may be easily completed and readily assembled according to simple instructions by persons relatively unfamiliar and inexperienced in electrical matters.

It is a further object of the herein described invention to provide an improved housing of insulating material, such as plastic, which is molded, or otherwise formed, to receive the component parts of the motor and support them in insulated and operative relationship, the various parts being arranged, positioned, and interengaged so as to require the use of relatively few securing members such as nuts, bolts, screws, or the like.

It is a further object of the invention to provide in a motor of the herein described character an improved armature construction in which the parts, when assembled, are so interlocked as to be retained in operative position without the use of additional or other securing means.

A still further object is to provide in an electric motor an improved commutator assembly, and novel connection means between the armature coil windings and the commutator segments.

Another object is to provide in an electric motor an improved field and field pole assembly, wherein the associated parts are supported in a novel manner on the motor housing, and coact to position and retain each other in operative assembled relationship.

Still another object of the invention is to provide an improved brush mounting and terminal connection means therefor, the brushes and terminal means further being utilized for connections to the field windings.

It is also an object to provide improved shaft journals or bearings of simplified construction for small motors of the herein described type.

Further objects of the invention will be brought out in the following part of the specification, wherein detailed description is for the purpose of fully disclosing prefered embodiments of the invention, without placing limitations on the scope of the invention defined in the appended claims.

2

Referring to the drawings which are for illustrative purposes only:

Fig. 1 is a side elevational view of a motor embodying the features of the present invention;

Fig. 2 is a plan view of the motor, the cover cap of the housing being removed to disclose the field poles and associated rotor therein;

Fig. 3 is a sectional view, taken substantially on line 3—3 of Fig. 2;

Fig. 4 is a sectional view showing the field winding and associated field poles, taken substantially on line 4—4 of Fig. 1;

Fig. 5 is a wiring diagram showing the motor connected to a power source, and schematically illustrating the motor parts;

Fig. 6 is a detailed schematic wiring diagram, including an enlarged side view of the connection terminals;

Fig. 7 is a detailed isometric view of an armature winding spool;

Fig. 8 is a detailed isometric view of an armature core section;

Fig. 9 is a fragmentary sectional view showing the manner in which the shaft is journaled in a contiguous portion of the housing;

Figs. 10a and 10b are left and right hand views of the terminal connections as shown from lines 10a—10a and 10b—10b, respectively, of Fig. 6;

Fig. 11 is a longitudinal sectional view through the rotor, showing details of the connections to an armature winding coil taken substantially on line 11—11 of Fig. 3; and Fig. 12 is an isometric view showing constructional details of the commutator core.

The electric motor as hereinafter described and shown in detail on the drawings is in general designed and constructed so that its component parts may be furnished in partially fabricated kit form and assembled into a complete motor by following simple assembly instructions. A certain amount of ingenuity is necessary to complete the component parts and assemble them into an operative device. In so doing, the device serves as an educational and instructional medium in the development of a child's mental processes and acquaints the child with the fundamental principles of electric motor operations.

As illustrated in Fig. 1 of the drawings, the component parts of the electric motor are associated with a housing, as generally indicated by the numeral 10, which is molded or otherwise formed from a suitable insulating or plastic material such as Vinylite.

More specifically, the housing includes a shelllike structure of generally ovate configuration which is divided horizontally to form a lower section 11 and a cap section 12 having a line of jointure 13 with the lower section.

The sections 11 and 12 are of thin walled construction and define a chamber or compartment 14 in the upper part of the housing for operatively receiving therein the armature assembly which will later be described.

The compartment 14 is ventilated by the provision of ventilation openings 15 in the end margins of the cap section. This cap section is horizontally maintained in proper registration with the upper rim 16 of the lower section by means of pines or studs 17 projecting from the rim portion of the cap arranged to enter suitable sockets 18 in thickened end wall portions 19 and 20 located at the opposite ends of the lower section.

Projecting below and integrally formed with the lower section is a pedestal support having an upstanding central rib portion 21. Approximately midway between the ends of the rib 21, there is provided on each side thereof a pair of spaced walls 22 and 23 which are integrally formed with the rib and lower section 11 and terminate at their lowermost ends in a foot piece 24 containing an opening 25 for receiving holding down screws.

The pedestal is of hollow construction and forms a lower compartment 26 having an open bottom for receiving thereinto a field coiled sector which will later be explained. The lower compartment 26 is separated from the upper compartment 14 by means of a separating web 27 provided adjacent its ends with openings 28 for a purpose to be explained later. Also, the compartment 14 is provided with side windows or openings 29 which communicate with the channel-like space between the side walls 22 and 23 on each side of the housing. The space between these two walls on each side also communicates at its uppermost portion with a side opening 30 on opposite sides of the upper compartment 14. As shown in Fig. 1, the end wall portions of the compartment 26 are inwardly offset slightly with reference to the side walls 22 and 23 to provide abutment shoulders 31 and 32.

The rotor assembly consists of an armature structure as generally indicated at 33 and a commutator structure as generally indicated at 34 which are carried by a common shaft 35 as indicated in Fig. 2 of the drawings. The armature structure comprises a plurality of core sections 36, in this instance, three in number. As shown in Fig. 8, each core section is formed from an initially rectangular strip of suitable material such as soft iron which is bent or otherwise deformed at a midline between its ends to produce angularly disposed arms 37 and 38 diverging outwardly at an angle of 120° relative to each other. These core sections as furnished in the kit are preformed as just described, and are assembled in back to back relation as shown in Fig. 4 with the arm of one section in spaced contact with the arm of an adjacent section so as to form three radially extending pole pieces as generally indicated by the numeral 39.

Slidably fitted over each pole piece is an armature winding spool, as shown in Fig. 7, formed of plastic to have a rectangular tubular portion 40 with integrally formed end flanges 41 and 42, the latter having a flange opening 43 therein for receiving one end of the winding therethrough and on the opposite side a similar opening 44 for receiving the other end of the winding therethrough. These spools are applied to the pole pieces before the winding is put on the spools, the spools having their end flanges 42 positioned innermost and in abutting relation so that they will act to position the spools on the pole pieces.

It will be noted that with the core sections so assembled, their apices conjointly form a shaft receiving passage 45. The shaft is of such size as to snugly fit in this passage, and when inserted therein, the shaft acts to force the core sections apart so that the arms in the pole pieces tend to move apart and thus are forced into tight retaining engagement with the interior wall of the winding spool. The assembled portion of the armature, as thus far described, has its parts locked in assembled relation by the shaft as just described. It will be noted that the winding spool for each pole piece is of such length that, when the spool is in proper position, the pole piece projects a slight amount beyond the outer end flange of the spool.

The armature structure is retained in proper position axially of the shaft 35 by means of tubular sleeves 46 and 47 of resilient material, such as rubber, which are pushed over the shaft on opposite sides of the core sections, as shown in Fig. 11.

The sleeve 46 also serves as a spacer for positioning a commutator insulator member 48 on the shaft in relation to the core sections. This insulator member, as shown in Fig. 12, is generally of tubular construction with longitudinally extending circumferentially spaced ribs 49 projecting from its outer surface at angular intervals of 120°. Midway between the ribs 49 and extending longitudinally of the insulator member, are gutters or grooves 50 in the outer surface of the insulator. As shown in Fig. 3, the commutator insulator member is so disposed circumferentially of the shaft that the ribs 49 are in axial alignment with the centers of the pole piece 39. The bore of the commutator insulator is of such size as to effect a sufficiently tight engagement with the shaft to hold the insulator in position, once it is assembled on the shaft.

The commutator insulator member having been placed on the shaft, a winding 51 is placed on each winding spool by winding an insulated conductor in the same direction around each spool, in the present instance, in a clockwise direction as viewed in Fig. 11. One set of corresponding ends of windings 51 is connected to segmental conductor members 52 which are respectively placed in the spaces between the ribs 49 of the commutator insulator, each winding end having first been bared of its insulation and placed in a gutter 50. The end thus makes electrical contact with its associated segmental member, and the end is further anchored by bending the extreme portion 53 back over the outer edge of the segmental member, as shown in Fig. 11. The segments are further retained in position on the commutator insulator by marginal thread bindings 54—54 which are carried circumferentially around the commutator and tied or otherwise secured. The winding ends are respectively connected in this manner to the segments lying to the right of the coil center in each case, as viewed in Fig. 3. In other words, for example, this end of the winding for the vertically disposed pole will be connected to the segmental member having its center disposed 60° in a clockwise direction from the central plane of the vertical pole.

The other ends of the windings 51 of each pole are brought out through the flange openings 44 in each case, and double-looped through an opening 55 in a metal washer 56 which is inserted over and positioned between the ends of the tubular sleeve 47. The washer 56 thus acts as a common connection for this set of ends of the armature windings 51. This completes the assembly of the rotor element of the motor, and this element is ready to be mounted in the housing.

Referring to Fig. 2, the rotor element is disposed with the ends of the shaft 35 respectively in notches 57 and 58 in the thickened end portions 19 and 20 of the lower section, and a pulley 59 is adjusted on the shaft so as to cooperate with the outer end of the tubular sleeve 47 to axially maintain the rotor in proper position.

The notches 57 and 58 are similarly constructed, and, as shown in Fig. 9, are provided with straight side walls and rounded bottoms 60 equal to half the circumference of the shaft. The depth of the notch is the same as the shaft diameter, so that when the cap section 12 is in position, its lower rim acts to retain the shaft in its notch or journal. The plastic material provides an excellent bearing surface for the shaft and is particularly well suited for small motor construction and operation. Moreover, by having the notch extend downwardly into the lower section, as described, the rotor may be operated with the cap section removed so as to observe operations and make any desired adjustments of the motor.

As shown in Fig. 4, the stator field structure comprises a core member 61 having reduced ends which form projecting end studs 62—62. The field winding is constructed before being assembled into the housing. A sheet of insulating material 63 is first wrapped around the surface of the core and a winding 64 placed over this insulation covering by winding a suitable conductor thereon. The winding then has an outer insulating cover 65 applied over its outer surface. This field structure, as just described, is now placed within the compartment 26, as shown in Fig. 4, with the end studs 62—62 projecting through the window openings 29—29.

Associated with the ends of the field structure are field poles 66—66. Each of these field poles comprises a strip of magnetizable material, such as soft iron, which is deformed to provide a straight end portion 67 which is bent at its innermost margin to provide an offset portion 68 which connects the portion 67 with an arcuate portion 69 at the other end of the field pole. The curvature of the portion 69 is substantially the same as the curvature of the portion of the housing which surrounds the upper compartment 14. The straight end portion 67 is provided with an aperture 70 for receiving therethrough one of the end studs 62 of the core member.

The field poles are assembled as shown in Fig. 4 with the ends studs 62 of the core member extending through the apertures 70 in each case. As thus assembled, the end portions 67 lie against the shoulders 31 and 32, and the offset portion 68 extends inwardly over the web 27. The field poles are retained in associated relation with the core structure of the field windings by means of small grip nuts 71 which are so constructed that upon being pushed over the studs 62, they grip the studs in such a way as to retain them thereon against removal. In the assembly just described, it will be apparent that the core of the windings acts as a spacer for positioning the field poles properly, and the field poles in turn provide supports for the field winding structure. The ends of the field windings, as indicated by the numeral 72, are respectively brought out through the openings 28—28 in the web 27 separating the upper and lower compartments of the housing.

The lower section of the housing is provided with apertures 73—73 for receiving thin metallic strip brush members 74 therethrough. The upper ends of these brush members are arranged to bear against the commutator as shown in Fig. 3, and the lowermost end portions extend into a groove 75 in each case formed on opposite sides of the central rib portion 21 of the pedestal. Other apertures 76—76 are provided also on opposite sides of the central rib portion 21 in the lower section of the housing to enable the ends 72—72 of the field winding to be brought out to the brushes.

Connections to the brushes are through vertically spaced terminals which include terminal bolts 77 and 78 which are supported in suitable apertures provided in the central rib portion 21 adjacent the grooves 75—75. As schematically shown in Fig. 6, one end of the winding 64 is wrapped around the head end of terminal bolt 77 and a fibre washer 79 is placed between the conductor and the associated brush 74. The fibre washer 79 extends over the brush and acts to retain it in the associated groove 75 against movement. The other end 72 of the field winding is brought out and laid along the surface of the other brush 74, making electrical contact with it. Two washers 80 and 81 are provided, the innermost being of fibre and the outer one of metal to form a contact surface for the innermost of a pair of terminal nuts 82—82 which, when tightened, retain the brushes in position and also serve for connecting a supply conductor 83 to the terminal bolt 77.

The terminal bolt 78 has a metal washer 84 at its head end which makes electrical contact with the adjacent brush 74. At the other end, the terminal bolt 78 has a fibre washer 85 which extends over the adjacent brush 74 and insulates the innermost of a pair of terminal nuts 86—86 relative to the brush, these nuts cooperating with the terminal bolt to assist in maintaining the brushes in proper position, and also serving for connecting a supply conductor 87 to the terminal bolt 78.

By reference to Fig. 6, the circuit through the connection terminals and brushes will now be explained. This circuit will be from the supply conductor 83, through the terminal bolt 77 to the end 72 of the field winding 64 connected to the head end of the terminal bolt, from the other end 72 of the winding 64 to the other brush 74, through two of the armature coils back to the right hand brush again, through the metal washer 84 to the terminal bolt 78, and thence to the other supply conductor 87. It will be noted that the terminal bolts, as shown in Figs. 10a and 10b, do not make electrical contact with the associated brushes directly, but the metal washers are utilized for such purpose.

As shown in Fig. 5, the supply conductors 83 and 87 may be connected to a battery which is indicated by the numeral 88. This battery, as a source of power, will operate the motor, and, if desired, a control switch 89 may be utilized in one of the supply conductors for connecting and disconnecting the battery relative to the motor. It will be further noted that, by the utilization of a common connection to the armature windings 51 on each pole, and since these windings are in the same direction, one of the pole pieces will be energized "north" and the other "south" each time the brushes contact two different segmental members of the commutator. This arrangement provides a very simple and effective mode of connecting the armature coils to the commutator.

I claim as my invention:

1. In an electric motor, a rotor assembly comprising: a shaft, an armature winding carried by said shaft, a round commutator core of insulating material on said shaft having circumferentially spaced axially extending ribs on its surface and axially extending grooves in its surface between the ribs, segmental members extending between said ribs secured to said core, and conductors connecting said segmental members with said winding, each of said conductors having an end portion disposed in one of said grooves in contact with the associated segmental member.

2. In an electrical motor, a rotor assembly comprising: a shaft, an armature winding carried by said shaft, a round commutator core of insulating material on said shaft having circumferentially spaced axially extending ribs on its surface and axially extending grooves in its surface between the ribs, segmental members extending between said ribs secured to said core, and conductors connecting said segmental members with said winding, each of said conductors being carried through one of said grooves and anchored by having its end bent back over the associated segmental member.

3. In an electric motor, a rotor assembly comrising a shaft, a plurality of armature poles carried by said shaft having similarly wound individual windings, a commutator core member on said shaft having axially extending circumferentially spaced grooves in its outer surface, and segmental conducting members insulated relative to each other secured over said grooves, said pole windings having one set of corresponding ends commonly connected and their other corresponding ends respectively anchored in said grooves in electrical contact with the segmental members.

4. In an electric motor, a housing of insulating material formed to provide an ovate casing defining a hollow armature compartment, said casing being horizontally separated to provide a lower section and an upper removable cap section and having openings on opposite sides thereof, a pedestal portion forming a support projecting downwardly from said lower section defining a field winding compartment having openings on opposite sides thereof, and a pole piece receiving channel on each side of said housing disposed in the openings on that side.

5. In an electric motor, a housing of plastic material formed to provide an ovate casing defining a hollow armature compartment, said casing being horizontally separated to provide a lower section and an upper removable cap section and having openings on opposite sides thereof, an integral pedestal portion projecting downwardly from said lower section defining a field winding compartment having openings on opposite sides thereof, a pole piece receiving channel on each side of said housing connecting with the openings on that side, and other openings defined by said casing adapted to receive therethrough the end portions of brush members insulatingly supported on said pedestal.

6. In an electric motor, a housing divided into two compartments, one of said compartments having aligned openings on opposite sides thereof, a field coil in said one compartment having a core member, the ends of which respectively extend into said openings, an armature journaled for rotational movement in the other of said compartments, and pole pieces connected to the ends of said core member extending into the other of said compartments into operative relationship with said armature.

7. In an electric motor, a housing divided into two compartments, one of said compartments having aligned openings on opposite sides thereof, a field coil in said one compartment having a core member, the ends of which respectively extend into said openings, an armature journaled for rotational movement in the other of said compartments, pole pieces connected to the ends of said core member extending into the other of said compartments into operative relationship with said armature, and interengaging portions on said housing and said pole pieces.

8. In an electric motor, a housing divided into two compartments, one of said compartments having aligned openings on opposite sides thereof, an armature journaled for rotational movement in said one of said compartments, pole pieces respectively extending into said openings for operative association with said armature, and a field coil in said other compartment having a magnetic circuit including said pole pieces.

9. In an electric motor, a multi-pole armature comprising a plurality of core sections, each of said sections being formed from a flat strip of magnetizable material to provide two angularly disposed arms, and said sections being assembled in nested relation to jointly form a common shaft passage and radially extending poles.

10. In an electric motor, an armature structure comprising a plurality of core sections each formed from a flat strip to provide outwardly diverging arms, said sections being assembled with an arm of each section cooperating with an arm of another section to form a radially extending pole and conjointly provide a shaft passage, means including a winding surrounding each pole, and a shaft extending through said passage acting to force said sections outwardly to cause the arms of each pole to make pressure engagement with said means.

11. In an electric motor, an armature structure comprising a plurality of core sections each formed from a flat strip to provide outwardly diverging arms, said sections being assembled with an arm of each section cooperating with an arm of another section to form a radially extending pole and conjointly provide a shaft passage, a tubular spool for receiving a winding conductor to be wound thereon surrounding each pole, and a shaft extending through said shaft passage of a size to force said sections outwardly to cause the arms of each pole to forcibly engage the associated spool.

12. In an electric motor, an armature winding pole structure having a shaft receiving passage, a shaft positioned in said passage, and sleeve members of resilient material surrounding said shaft respective positioned on each side of the pole structure for retaining it in a position in a direction axially of the shaft.

13. In an electric motor having a field winding and a commutator, a pair of conducting strips forming brushes operatively associated with said commutator, a pair of conducting terminal bolts supported in spaced relation to said strips and each constituting part of the securing means for both brushes, members carried by each of said bolts for making clamping engagement with said brushes, end connections of said field winding respectively connected adjacent the ends of one of said bolts, one of said end connections being in electrical contact with one brush and the other end connection in contact with the bolt, and an electrical connection between the other of said bolts and said other of the brushes.

14. In an electric motor having a field winding and a commutator, terminal and supporting means for a pair of spaced brush strips operatively associated with said commutator, said means comprising a conducting terminal bolt supported in spaced relation to said brush strips, members of insulating material carried by said bolt adjacent its ends extending over said strips, one end connection of said field winding being positioned between one of said members and a brush strip to make electrical contact therewith, another end connection of said field winding being positioned between the other of said members and a portion of said bolt to make electrical contact therewith, and means coacting with said bolt to move said members in a direction toward the brush strips.

CARLOS B. LIVERS.

REFERENCES CITED

The following references are of record in the file of this patent:

UNITED STATES PATENTS

| Number | Name | Date |
|---|---|---|
| 1,169,779 | Mueller | Jan. 25, 1916 |
| 1,540,038 | Spielman | June 2, 1925 |
| 1,778,678 | Knecht | Oct. 14, 1930 |
| 1,793,834 | Barsch | Feb. 24, 1931 |
| 2,233,623 | Miner et al. | Mar. 4, 1941 |
| 2,323,945 | Strauss et al. | July 13, 1943 |